United States Patent [19]

Fukasawa

[11] 4,215,647
[45] Aug. 5, 1980

[54] INDICATOR GAUGE WITH ILLUMINATED POINTER

[75] Inventor: Noburu Fukasawa, Kamakura, Japan

[73] Assignee: Nissan Motor Company, Limited, Yokohama, Japan

[21] Appl. No.: 909,946

[22] Filed: May 26, 1978

[30] Foreign Application Priority Data

May 30, 1977 [JP] Japan ............................ 52-68595[U]

[51] Int. Cl.² .......................................... G01D 11/28
[52] U.S. Cl. ............................ 116/286; 116/DIG. 36; 362/29
[58] Field of Search ......... 116/129 P, 129 L, DIG. 5, 116/DIG. 36, 286, 288, 263, 310; 362/23, 29, 30, 293

[56] References Cited

U.S. PATENT DOCUMENTS

| | | | |
|---|---|---|---|
| 2,071,284 | 2/1937 | Hyland | 116/288 |
| 2,173,316 | 9/1939 | Sproule | 116/288 |
| 2,314,817 | 3/1943 | Christensen | 116/288 |
| 2,328,485 | 8/1943 | Ott | 116/288 X |
| 2,831,453 | 4/1958 | Hardesty | 116/DIG. 36 |
| 2,874,671 | 2/1959 | Blackwell et al. | 116/288 |
| 2,914,021 | 11/1959 | Blackwell et al. | 116/288 |
| 2,916,011 | 12/1959 | Molis | 116/288 |
| 3,005,439 | 10/1961 | Ellenwood et al. | 362/30 X |
| 3,216,394 | 11/1965 | Blackwell | 116/288 |
| 3,241,256 | 3/1966 | Viret et al. | 362/30 X |
| 3,503,365 | 3/1970 | Baez et al. | 116/288 X |
| 3,699,915 | 10/1972 | Greene | 116/288 |
| 3,867,623 | 2/1975 | Widlund | 362/303 X |
| 4,004,546 | 1/1977 | Hartand | 116/288 X |

FOREIGN PATENT DOCUMENTS

| | | | |
|---|---|---|---|
| 2125216 | 12/1971 | Fed. Rep. of Germany | 362/29 |
| 2330765 | 6/1973 | Fed. Rep. of Germany | 362/29 |
| 2236417 | 2/1974 | Fed. Rep. of Germany | 362/29 |
| 1185340 | 7/1959 | France | 116/286 X |
| 50-81253 | 7/1975 | Japan | 116/288 X |
| 544886 | 5/1942 | United Kingdom | 116/286 X |

*Primary Examiner*—Daniel M. Yasich
*Attorney, Agent, or Firm*—Schwartz, Jeffery, Schwaab, Mack, Blumenthal & Koch

[57] ABSTRACT

Light rays for illuminating the indicating portion of the indicator pointer come from the hub portion of the same where the rotational axis of the pointer lies, so that constant illumination on the indicating portion is achieved irrespective of the angular position change of the indicating portion relative to the dial board.

10 Claims, 7 Drawing Figures

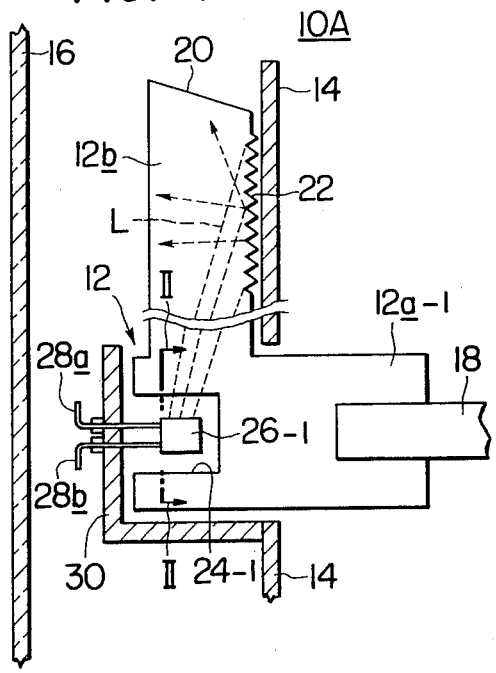
FIG. 1
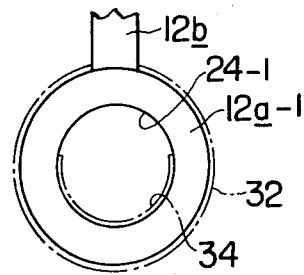
FIG. 2A
FIG. 2B
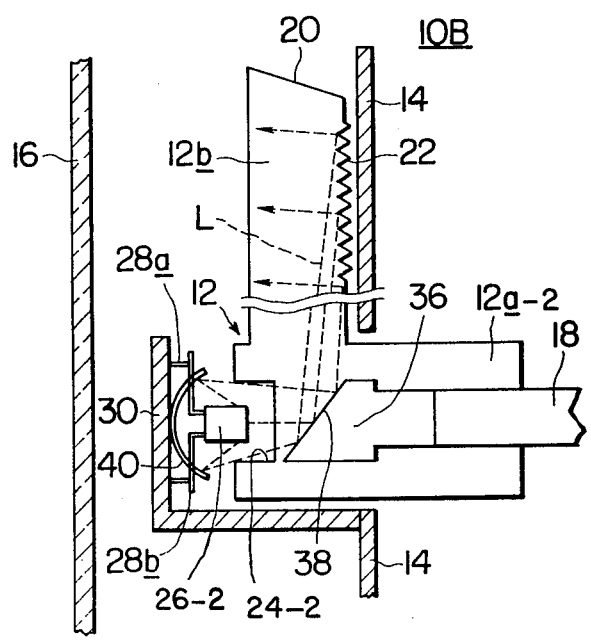
FIG. 3

INDICATOR GAUGE WITH ILLUMINATED POINTER

FIELD OF THE INVENTION

The present invention relates in general to an illuminated indicator gauge, such as speedometer and tachometer for a motor vehicle, and more particularly to such a gauge having an illuminated pointer.

BACKGROUND OF THE INVENTION

Since many indicator gauges are used in surroundings which receive very little light, either naturally or artificially, various arrangements for achieving easy read of the gauges have been proposed. One of these conventional arrangements is an arrangement which, as has been disclosed in Japan Utility Model publication No. 52-43447, comprises a luminous diode or the like set in the top section of a swingable indicator pointer, and a pair of lead wires or the like connected to the diode for feeding current to the same from an electrical power source. However, in such type arrangement, there arises a problem in that the swingable movement of the pointer can not be smoothly made because of increase of the weight of the pointer assembly. In fact, this problem becomes most critical in a use with an eddy-current type gauge because sufficient torque is not provided by this type gauge. Although the movement of the pointer may become somewhat smooth by thinning the wires and the diode, the mechanical strength of these elements is reduced from the very nature of things, thereby causing high probability of breakage of the same. Furthermore, the existence of the wires will cause the pointer to have a considerably limited rotating range.

SUMMARY OF THE INVENTION

Accordingly, an object of the present invention is to solve the problems encountered in the above-mentioned conventional indicator gauge.

Another object of the present invention is to provide an indicator gauge having an indicator pointer which is effectively illuminated to be easily noticed.

Still another object of the present invention is to provide an indicator gauge having an indicator pointer the hub portion of which receives light rays from a light source located in a portion of the rotational axis of the pointer to effectively illuminate the indicating portion of the pointer.

BRIEF DESCRIPTION OF DRAWINGS

Other objects and advantages of the present invention will become apparent from the following description when taken in conjunction with the accompanying drawings, in which:

FIG. 1 is a schematical sectional view of a first preferred embodiment of an indicator gauge according to the invention;

FIGS. 2A and 2B are views taken on the line II—II of FIG. 1, showing different forms of a hole formed in the pointer of the indicator gauge; and FIGS. 3 to 6 are views similar to that of FIG. 1, but show, second, third, fourth and fifth embodiments of the indicator gauge of the invention.

DESCRIPTION OF THE PREFERRED EMBODIMENTS

Figure 4:
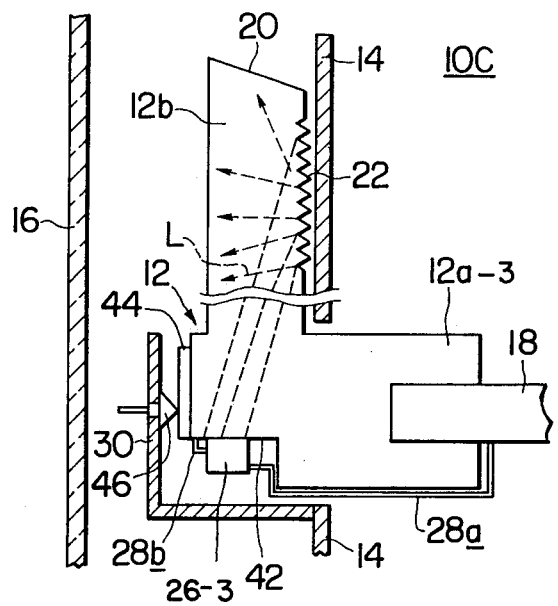

Referring to FIG. 1, there is schematically illustrated an indicator gauge 10A as the first embodiment of the invention. The gauge 10A generally comprises an indicator pointer 12, a dial board 14 on which a scale of indicia is marked and a transparent viewing window 16. The indicator pointer 12 is made of a transparent material such as acryl resin or polycarbonate resin and includes a hub portion 12a-1 secured to a spindle 18 of a movement (not shown), and an indicating portion 12b radially outwardly extending from an end of the hub portion 12a-1. As shown, the indicating portion 12b is located between the viewing window 16 and the dial board 14 so as to move over the face of the dial board 14 adjacent to the scale of indicia. The indicating portion 12b is formed with an inclined section 20 at the top end thereof and has at a rear surface thereof facing the dial board 14 translucent matted finish 22. If desired, the surface may be painted or metal-coated in stead of the matted finish. Denoted by numeral 24-1 is a blind hole or recess formed in the end of the hub portion 12a-1. The hole 24-1 may have the form of cylinder or rectangular prism (24-1') as will be understood from FIGS. 2A and 2B. Now, it should be noted that the hole 24-1 is such arranged as to be coaxial with the spindle 18. Further, in case of using the rectangular prism hole, 24-1' one side surface of the hole should be arranged perpendicular to the longitudinal axis of the indicating portion 12b as will be understood from FIG. 2B. An illuminating or light source 26-1 such as an electric light bulb and/or a light emitting diode (LED) is spacedly located in the hole 24-1 of the pointer 12 and supported through two lead wires 28a and 28b by a small cover member 30 which extends forwardly from the dial board 14. Although not shown in the drawings, lead lines for connecting the lead wires 28a and 28b to an electric power source are provided in a conventional manner. Preferably, the illuminating source 26-1 is such arranged that light source proper thereof, such as a filament in case of the bulb, is positioned in or at least in the vicinity of an imaginary axis of the spindle 18 by the reason which will become apparent later.

With this, when the illuminating source 26-1 is energized to light, light rays from the light source 26-1 enter the indicating portion 12b and are reflected forwardly and partially upwardly at the metted finish back face 22 in a manner as indicated by broken lines L. The light rays directed upwardly are then reflected forwardly at the inclined section 20 of the pointer 12. Thus, the indicating portion 12b is wholly illuminated to be easily noticed.

If desired, the exterior surface of the hub portion 12a-1 or 12a-1' may be coated with dark or opaque paint 32 and the interior surface of the same, which bounds the hole 24-1 or 24-1', may be partially covered by suitable reflecting layer 34 as shown in FIGS. 2A and 2B. With this, a better lighting effect is provided in the pointer 12.

Referring to FIG. 3, there is illustrated an indicator gauge 10B as the second embodiment according to the invention. For facilitation of description hereinafter, substantially same parts will be denoted by the same numerals as in the case of FIG. 1 with a hyphenated suffix added thereto and a detailed explanation of these elements will be omitted from the following description. In this second embodiment, a bore or hole 36 is formed in the hub portion 12a-2 to define or form an inclined or beveled surface 38 which faces toward the hole 24-2. Furthermore, a concave mirror 40 is arranged in front of the illuminating source 26-2, as shown in the drawing. With this, the light rays from the illuminating source 26-2 are completely reflected backwardly at the mirror 40 to wholly enter into the pointer 12 thereafter to be reflected upwardly at the inclined surface 38 of the bore 36, in a manner as indicated by the broken lines L. If desired, the exterior surface of the hub portion 12a-2 may be coated with the dark paint for the same reason as mentioned above.

Referring to FIG. 4, there is illustrated an indicator gauge 10C as the third embodiment according to the invention. In this embodiment, a step portion 42 is formed in the hub portion 12a-3 as a substitute for the above-mentioned hole of the first or the second embodiment. As is seen, the step portion 42 has a flat surface which faces in a direction opposite to the direction in which the indicating portion 12b extends. The illuminating source 26-3 is attached to the step portion 42 to be moved with the pointer 12. Terminals (not shown) arranged on the illuminating source 26-3 are connected through respective wires 28a and 28b to the spindle 18 and an electrically conductive pin seat member 44 which is attached to the end of the hub portion 12a-3. A conductive pin member 46 is fixed to the cover member 30 so as to be in slidable contact with the pin seat member 44. The pin member 46 is arranged to be coaxial with the spindle 18. The cover member 30 is made of non-conductive material for preventing short circuit between the spindle 18 and the pin member 46 which are connected to an electrical power source (not shown). With this, the light rays from the illuminating source 26-3 are directed and reflected in a manner as being indicated by the broken lines L thereby to illuminate the pointer 12. If desired, the exterior surface of the hub portion 12a-3 may be coated with dark paint for the same reason as mentioned before.

Figure 5:
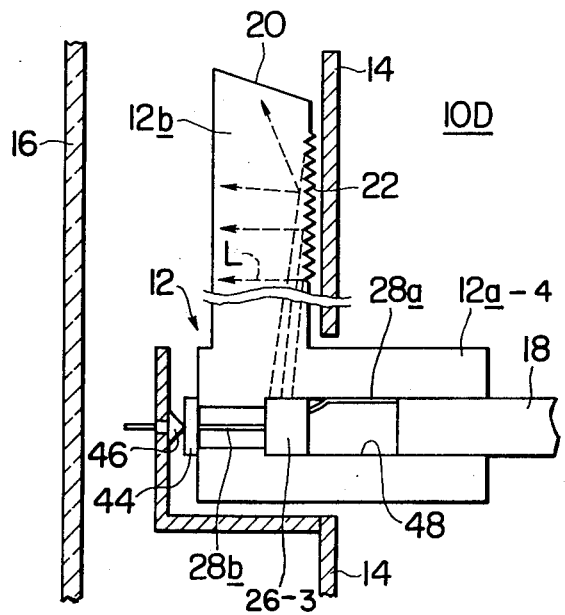

Referring to FIG. 5, there is shown an indicator gauge 10D as the fourth embodiment of the subject invention. The indicator gauge 10D of this embodiment is a modification of that of the above-mentioned third embodiment of FIG. 4. The pointer 12 of this fourth embodiment has a stepped bore 48 in the hub portion 12a-4 as a substitute for the step portion 42 of the third embodiment, as shown. The illuminating source 26-3 is disposed in the bore 48 to seat on the step (no numeral) of the bore 48. Two lead wires 28a and 28b extend from the illuminating source 26-3 to connect with the spindle 18 and the pin seat member 44, respectively. The indicator gauge 10D has a merit in that the lead wires 28a and 28b have shorter lengths in comparison with the third embodiment, further more in that the swingable movement of the pointer 12 about the axis thereof is not affected or interrupted by the provision of lead wire 28a as in the case of the third embodiment. If desired, the exterior surface of the hub portion 12a-4 may be painted dark by the before-mentioned reason.

Figure 6:
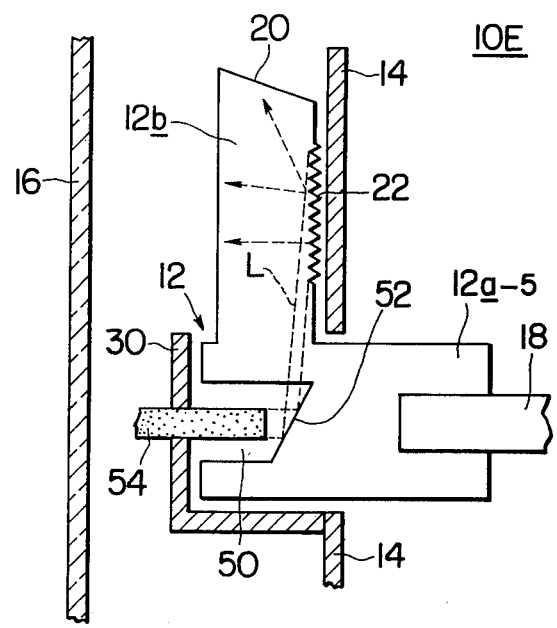

Referring to FIG. 6, there is illustrated an indicator gauge 10E as the fifth embodiment according to the invention. In this embodiment, a hole or recess 50 is formed in the end of the hub portion 26-3 of the pointer 12 to be coaxial with the spindle 18. As indicated by numeral 52, the bottom of the hole 50 is inclined or beveled with respect to the imaginary axis of the spindle 18. A light conducting elongate member 54 such as a bundle of glass fibers is fixed to the cover member 30 to project at one end thereof into the hole 50. Although not shown in this drawing, the light conducting elongate member 54 extends to an illuminating source. Preferably, the one end section of the light conducting elongate member 54 is arranged to be coaxial with the spindle 18 so that light rays from an end of the light conducting elongate member 54 can pass the same paths in the pointer 12 irrespective of the angular position change of the indicating portion 12b relative to the dial board 14. The inclined bottom 52 may be covered with suitable mirror layer for increasing the lightening effect in the pointer 12. Of course, the exterior surface of the hub portion 26-3 may be painted dark, if desired.

With the above, it will be appreciated that since the light rays for illuminating the indicating portion 12b of the indicator pointer come from the hub portion where the rotational axis of the pointer lies, constant illumination on the indicating portion is achieved irrespective of the angular position change of the indicating portion relative to the dial board.

Furthermore, the provision of the hole or the step portion in the indicating pointer causes the reduced weight thereof thereby permitting smooth and sensitive movement of the pointer.

It should be noted that the foregoing description shows only five embodiments. Various modifications are apparent to those skilled in the art without departing from the scope of the present invention which is only limited by the appended claims.

What is claimed is:

1. An indicator gauge comprising:
   (a) a spindle mounted for rotation about its longitudinal axis;
   (b) a dial board mounted perpendicular to said spindle and having a face side and a through hole;
   (c) a viewing window mounted in front of said dial board;
   (d) an indicator pointer including:
      (i) a hub portion spacedly received in said hole of said dial board to be coaxially connected at one end thereof to said spindle,
      (ii) an elongated indicating portion integrally connected with said hub portion and extending radially outwardly from the outer end of said hub portion, said indicating portion mounted for movement between said face side of said dial board and said viewing window in response to rotation of said spindle about its axis, and
      (iii) said hub portion and indicating portion made of a light transmitting material;
   (e) said hub portion having at said other end thereof a blind hole which extends in the same direction as said spindle longitudinal axis;
   (f) a cover member supported by said dial board and arranged between said viewing window and said dial board in a manner to conceal said blind hole from a view taken in the direction from said viewing window toward said dial board; and
   (g) a light source supported by only said cover member and having a light emitting section from which light rays are emitted, said light emitting section spacedly accommodated within said blind hole and aligned to be coaxial with said spindle.

2. An indicator gauge as claimed in claim 1, in which the surface by which said blind hole as defined is metal-coated.

3. An indicator gauge as claimed in claim 1, in which said indicating portion of said pointer has a matted finish at the rear surface thereof facing said dial board.

4. An indicator gauge as claimed in claim 1, in which said indicating portion of said pointer is provided at the leading end thereof with an inclined section.

5. An indicator gauge as claimed in claim 1, in which said blind hole is a cylindrical hole which is coaxial with said spindle.

6. An indicator gauge as claimed in claim 1, in which said blind hole is a rectangular prism hole.

7. An indicator gauge as claimed in claim 1, in which the bottom of said blind hole is inclined with respect to the axis of said spindle so that the light rays from said light emitting section are reflected on the inclined bottom to be directed toward the radially outwardly extending end of said indicating portion to illuminate the same.

8. An indicator gauge as claimed in claim 7, in which the inclined bottom is covered by a mirror layer.

9. An indicator gauge as claimed in claim 1, in which the exterior of said hub portion except said blind hole is coated with opaque paint.

10. An indicator gauge as claimed in claim 1, in which said cover member is connected to said dial board.

* * * * *